(12) United States Patent
Suojasto

(10) Patent No.: US 8,260,743 B2
(45) Date of Patent: Sep. 4, 2012

(54) METHOD FOR THE DELIVERY OF AREA RELATED MESSAGES IN A MOBILE COMMUNICATION SYSTEM

(75) Inventor: Marko Suojasto, Pirkkala (FI)

(73) Assignee: Nokia Corporation, Espoo (FI)

( * ) Notice: Subject to any disclaimer, the term of this patent is extended or adjusted under 35 U.S.C. 154(b) by 164 days.

(21) Appl. No.: 11/165,706

(22) Filed: Jun. 24, 2005

(65) Prior Publication Data

US 2006/0271551 A1    Nov. 30, 2006

Related U.S. Application Data

(60) Provisional application No. 60/683,882, filed on May 24, 2005.

(51) Int. Cl.
G06F 7/00 (2006.01)
G06F 17/00 (2006.01)
(52) U.S. Cl. .................. 707/631; 707/634; 707/663
(58) Field of Classification Search .................. 707/631, 707/634, 763
See application file for complete search history.

(56) References Cited

U.S. PATENT DOCUMENTS

| | | | |
|---|---|---|---|
| 5,628,051 A * | 5/1997 | Salin ............... | 455/433 |
| 6,208,866 B1 | 3/2001 | Rouhollahzadeh et al. | |
| 6,487,413 B1 * | 11/2002 | Suojasto ............ | 455/446 |
| 2003/0023726 A1 * | 1/2003 | Rice et al. ........ | 709/225 |
| 2004/0095954 A1 * | 5/2004 | Varney et al. ........ | 370/444 |
| 2004/0103158 A1 * | 5/2004 | Vella et al. ........ | 709/206 |
| 2004/0246984 A1 * | 12/2004 | Hundscheidt et al. ....... | 370/432 |
| 2005/0043037 A1 | 2/2005 | Ioppe et al. | |
| 2006/0126556 A1 * | 6/2006 | Jiang et al. ........ | 370/328 |

FOREIGN PATENT DOCUMENTS

| | | |
|---|---|---|
| EP | 1 045 609 A1 | 10/2000 |
| EP | 1 209 886 A2 | 5/2002 |

OTHER PUBLICATIONS

3GPP TS 23.228 version 5.12.0 Release 5, "Digital cellular telecommunications System (Phase 2+) . . . ", Mar. 2004, 132 pages.

* cited by examiner

Primary Examiner — Hung T Vy
Assistant Examiner — Hexing Liu
(74) Attorney, Agent, or Firm — Harrington & Smith

(57) ABSTRACT

The invention relates to a method for the delivery of messages to a specified geographical area in a communication system. In the method is specified for an application server a geographical area and a message for delivery. The geographical area is translated to a first set comprising at least one cell set. Each the cell set comprising at least one cell. A search is performed in the database server using at least the first set as search criterion. A search request is sent specifying a second set comprising at least one cell set to at least one serving node. A search is performed in a database comprised in the at least one serving node with the second set as a criterion. From the at least one serving node is provided in response a list comprising information on the subscribers in the area of the second set. Finally, the message is sent from the application server to the subscribers.

20 Claims, 5 Drawing Sheets

METHOD FOR THE DELIVERY OF AREA RELATED MESSAGES IN A MOBILE COMMUNICATION SYSTEM

CROSS-REFERENCE TO RELATED APPLICATIONS

This application claims the benefit of U.S. Provisional Application No. 60/683,882 filed May 24, 2005, which is incorporated by reference herein in its entirety

BACKGROUND OF THE INVENTION

1. Field of the Invention

The invention relates to the mass delivery of messages. Particularly, the invention relates to a method for the delivery of area related messages in a mobile communication system.

2. Description of the Related Art

Mobile terminals provide an intriguing opportunity for the geographical segmentation of mass delivery messages. Examples of such messages comprise advertisements, informational notifications and emergency alert messages. The most important category is the emergency alert messages, which may be related to, for example, environmental catastrophes, terror attacks or police assistance requests identifying missing children or escaped convicts.

However, in existing mobile communication systems there is currently insufficient support for the delivery of area related messages with short delay requirements. In current technology the determination of the subscribers in a given area requires expensive procedures. It is usually required to form dump copies of any given location database. The dump copy is then analyzed using sequential brute-force search methods to determine the subscribers located in a given area at the time when the dump copy was formed. The sequential brute-force searches are required, because the location databases are not pre-indexed based on cells, location areas or other cell sets. Instead, the location databases are indexed using Mobile Station (MS) ISDN numbers (MSISDN) and International Mobile Subscriber Identities (IMSI). After the subscribers in a given location area have been determined, the subscriber identities may be provided to a server. The server takes care of the delivery of the messages to the subscribers via a messaging center such as a Short Message Service Center (SMS-C) or a Multimedia Message Service (MMS) center. Unfortunately, the whole process may take up to several hours during which the subscriber may have moved to an entirely different area.

Reference is now made to FIG. 1, which illustrates a Global System of Mobile Communications (GSM) network in the prior art. In FIG. 1 there is a Mobile Station (MS) 100, which communicates with a Base Transceiver Station (BTS) (not shown) via radio access. There is also a GSM/UMTS BSS 160, which is connected to a GSM/UMTS circuit switched core network comprising at least an MSC 150, a VLR 152, a GMSC 156, an HLR 154 and a CSE 158. GSM/UMTS BSS 160 is connected to MSC 150. VLR 152, stores information on the location areas of the subscribers registered to VLR 152. MSC 150 is connected to GMSC 156. There is also HLR 154, which stores subscriber data pertaining to the location of subscribers and their service data. GMSC 156 is also connected to PSTN 126. CSE 158 controls GMSC 156 and MSC 150 in the providing of IN services to the subscribers served by BSS 160. CSE 158 has also an interface to HLR 154, which allows the enquiring and modifying of service data in HLR 154. A plurality of standardized supplementary services is implemented directly by MSC 150, GMSC 156, VLR 152 and HLR 154. Examples of such services include call forwarding, call waiting, call transfer, call completion to busy subscriber, closed user group and call barring. In addition to these there may be a variety of vendor specific supplementary services implemented directly in these network elements. In the prior art, dump copies may be made of VLR and HLR databases.

Reference is now made to FIG. 2, which illustrates a prior art Universal Mobile Telecommunications System (UMTS), which supports also access via WLAN. In FIG. 2 there is shown a dual-system mobile station 200. The mobile station may also be a single system mobile station supporting only licensed band radio access. Mobile station 200 is capable of communicating both using an unlicensed band radio access and using licensed band radio access. There is an unlicensed band Base Transceiver Station (BTS) 202. BTS 202 is connected to a Customer Premises Equipment (CPE) 204, which is, for example, an access router. To CPE 204 is connected a Session Border Controller (SBC) 206. There may be a number of unlicensed band base transceiver stations, which are connected via CPE 204 to SBC 206. SBC 206 acts as a SIP proxy and hides the address space within the operator's network, which comprises at least IP access network 208 and the IMS network elements, from MS 200. User plane traffic to/from MS 200 goes via SBC 206. Session border controller 206 is connected to IP access network 208, which performs the packet transport for all user plane related data traffic.

In FIG. 2 there is also shown a licensed band radio access network 220 to which is connected a base transceiver station 221. Licensed band radio access network 220 is, for example, a 2G GSM radio access network or a 3G UMTS radio access network. A licensed band IP Connectivity Access Network (IP-CAN) functionality connected to access network 220 comprises at least a serving GPRS support node SGSN 222 and a gateway GPRS support node 224. SGSN 222 performs all mobility management related tasks and communicates with a Home Subscriber Server (HSS) 250. GGSN 224 provides GPRS access points to a media gateway 226 and to a Proxy Call State Control Function (P-CSCF) 230. GGSN 224 establishes Packet Data Protocol (PDP) contexts, which are control records associated with a mobile subscriber such as mobile station 200. A PDP context provides an IP address for packets received from mobile station 200 or any other mobile station that is connected to the licensed band IP connectivity access network 220. The GPRS is disclosed in the 3G Partnership Project specification 23.060.

The communication system illustrated in FIG. 2 comprises IP Multimedia Subsystem (IMS) functionality. The network elements supporting IMS comprise at least one Proxy Call State Control Function (P-CSCF), at least one Inquiring Call State Control Function (I-CSCF), at least one Serving Call State Control Function S-CSCF, at least one Brakeout Gateway Control Function (BGCF) and at least one Media Gateway Control Function (MGCF). As part of the IMS there is also at least one Home Subscriber Server (HSS). Optionally, there is also at least one Application Server, which provides a variety of value-added services for mobile subscribers served by the IP multimedia subsystem (IMS). The IMS is disclosed in the 3G Partnership Project (3GPP) specification 23.228. P-CSCF 230 receives signaling plane packets from GGSN 224. P-CSCF approves Quality of Service (QoS) allocation for the signaling plane PDP context opened in GGSN 224. In the signaling plane packet is carried a Session Initiation Protocol (SIP) signaling message. The Session Initiation Protocol (SIP) is disclosed in the Internet Engineering Task Force (IETF) document RFC 3261. The signaling message is processed by P-CSCF 230, which determines the correct serving network for the mobile station that has sent the signaling packet. The determination of the correct serving network is based on a home domain name provided from mobile station 200. Based on the home domain name is determined the correct I-CSCF, which in FIG. 2 is I-CSCF 232. I-CSCF 232 hides the topology of the serving network from the networks, in which mobile station 200 happens to be roaming. I-CSCF 232 takes contact to home subscriber server 250, which returns the S-CSCF name, which is used to determine the address of the S-CSCF to which the mobile station 200 is to be registered.

In FIG. 2 the S-CSCF determined for mobile station 200 is S-CSCF 234. S-CSCF 234 obtains information pertaining to mobile station 200 from HSS 250. The information returned from HSS 250 may comprise trigger information that is used as criterion for notifying an application server 252. Application server 252 may be notified on events relating to incoming registrations or incoming session initiations. Application server 252 communicates with S-CSCF 234 using the ISC-interface. The acronym ISC stands for IP multimedia subsystem Service Control interface.

The ISC interface is disclosed in the 3GPP specification 23.228. The protocol used on ISC interface is SIP. AS 252 may alter SIP invite message contents that it receives from S-CSCF 234. The modified SIP invite message is returned back to S-CSCF 234. If the session to be initiated is targeted to a PSTN subscriber, the SIP invite message is forwarded to a BGCF 240. BGCF 240 determines the network in which PSTN interworking should be performed. In case PSTN interworking is to be performed in the current network, the SIP invite message is forwarded to MGCF 242 from BGCF 240. MGCF 242 communicates with MGW 226. The user plane packets carrying a media bearer or a number of interrelated media bearers for the session are routed from GGSN 224 to MGW 226 as illustrated in FIG. 2 using line 262.

In case mobile station 200 communicates via the unlicensed band radio access, the packets are sent via BTS 202, CPE 204 and SBC 206 to IP access network 208. Signaling packets are received in P-CSCF 238. Based on a home domain name provided in the signaling packet P-CSCF 238 determines the correct I-CSCF, to which the signaling packet is to be sent.

In FIG. 2 the I-CSCF is I-CSCF 236. I-CSCF 236 queries the HSS 250 to determine the correct S-CSCF for mobile station 200. In this case S-CSCF 234 is determined. Depending on the called party SIP URI S-CSCF 234 determines whether the session is to be routed to a second S-CSCF or to a BGCF such as BGCF 240.

The same problems also appear whenever location information must be obtained from UMTS or GPRS location databases. The location databases are maintained, for example, in an SGSN, in a serving CSCF and in the HSS. The location databases may not be indexed using other attributes than subscriber identities. The use of these same location registers for subscriber filtering, based on area, may introduce additional load, which may be difficult to predict in system dimensioning.

The problem in prior art systems is that they do not address geographical segmentation of mass delivery messages. There are no current methods that would enable the timely filtering of the subscribers within a given area. For the purpose of this application, an area may be defined as a group comprising at least one cell. Examples of areas are GSM location areas, GPRS routing areas and UMTS system areas.

SUMMARY OF THE INVENTION

The invention relates to a method for the delivery of messages to a specified geographical area in a communication system comprising at least a mobile station, at least one serving node, a database server and an application server. The method comprises: specifying for the application server a geographical area and at least one message for delivery; translating the geographical area to a first set comprising at least one cell set in which there is at least one cell; performing a search in the database server using the first cell set as search criterion; sending a search request specifying a second cell set to at least one serving node; performing a search in a database of the serving node using the second set as a criterion; in response providing from the serving node a list comprising information on subscriber/subscribers in the area of the second set; and delivering the message from the application server to the subscribers on the list.

The invention relates also to a system for the delivery of messages to a specified geographical area comprising: at least one mobile station; an application server configured to define a geographical area and generate at least one message for delivery. The application server translates the geographical area to a first cell set comprising one or more cells, and requests the delivery of the message from the application server a subscriber. The system further comprises a database server configured to perform a search using the first cell set as search criterion and to send a search request specifying a second cell set comprising at least one cell set to a serving node configured to perform a search in a database one of the serving node using the second cell set as a criterion and to provide, in response, a listing of subscribers in the area of the second set.

The invention relates also to a network node for identifying subscribers in the area of a cell set in one or more of the following: a location register; a monitoring database; a mobility management entity, configured to report information on a location update for a monitoring database entity and to perform location update to the location register. Information is recorded including a subscriber identity for the routing of messages to the mobile subscriber performing the location update. The monitoring database entity is configured to perform a search in the monitoring database using an identified cell set as a criterion and to provide., in response, a listing of information on subscribers in the area of the cell set.

The invention relates also to a computer program comprising code adapted to perform the following steps when executed on a data-processing system: reporting information on a location update for a monitoring database entity, the information comprising a subscriber identity for the routing of messages to the mobile subscriber performing the location update; performing location updates to the location register; receiving information on at least one cell set from a remote node; performing a search in a monitoring database using the at least one cell set as a criterion; and providing, in response to the remote node, a listing of information subscribers in the area of the received cell set.

In one embodiment of the invention, the application server defines a monitoring period in the search request. Later on, a location update message is received in a first serving node and by the mobility management entity. The monitoring database entity determines whether the monitoring period has not expired and whether the location update is from a subscriber in the area of the identified cell set. If the period has not expired and the subscriber is in the area of the cell set, the monitoring database entity reports the subscriber to the application server.

In one embodiment of the invention, the remote node is the database server used by the application server to retrieve information on the subscribers in a given area.

In one embodiment of the invention the location update is a GSM or UMTS location update procedure. In one embodiment of the invention, a cell set is a location area, a routing area or a service area. In this embodiment the first set comprises at least one location area, routing area or service area.

In one embodiment of the invention the database server provides an aggregated view of the database fragments stored in the monitoring databases of the at least one serving node. In order to perform an up to date query on the aggregated view, the database server spawns queries for the at least one serving node holding the database fragments.

In one embodiment of the invention the serving node comprises at least one of a Mobile Services Switching Center (MSC), a Serving General Packet Radio Service Node (SGSN) and a Call State Control Function (CSCF).

In one embodiment of the invention, the serving node comprises a Session Initiation Protocol (SIP) proxy or server.

In one embodiment of the invention, the communication system comprises at least one of a Global System of Mobile Communications (GSM) network and a Universal Mobile Telephone System (UMTS) network.

In one embodiment of the invention, the serving nodes belong to the IP Multimedia Subsystem (IMS) Call State Control Functions (CSCF).

In one embodiment of the invention, the computer program is stored on a computer readable medium. The computer readable medium may be a removable memory card, magnetic disk, optical disk or magnetic tape.

The benefits of the invention are related to the enabling of short delay delivery of messages to the subscribers within a given geographical area.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 3:
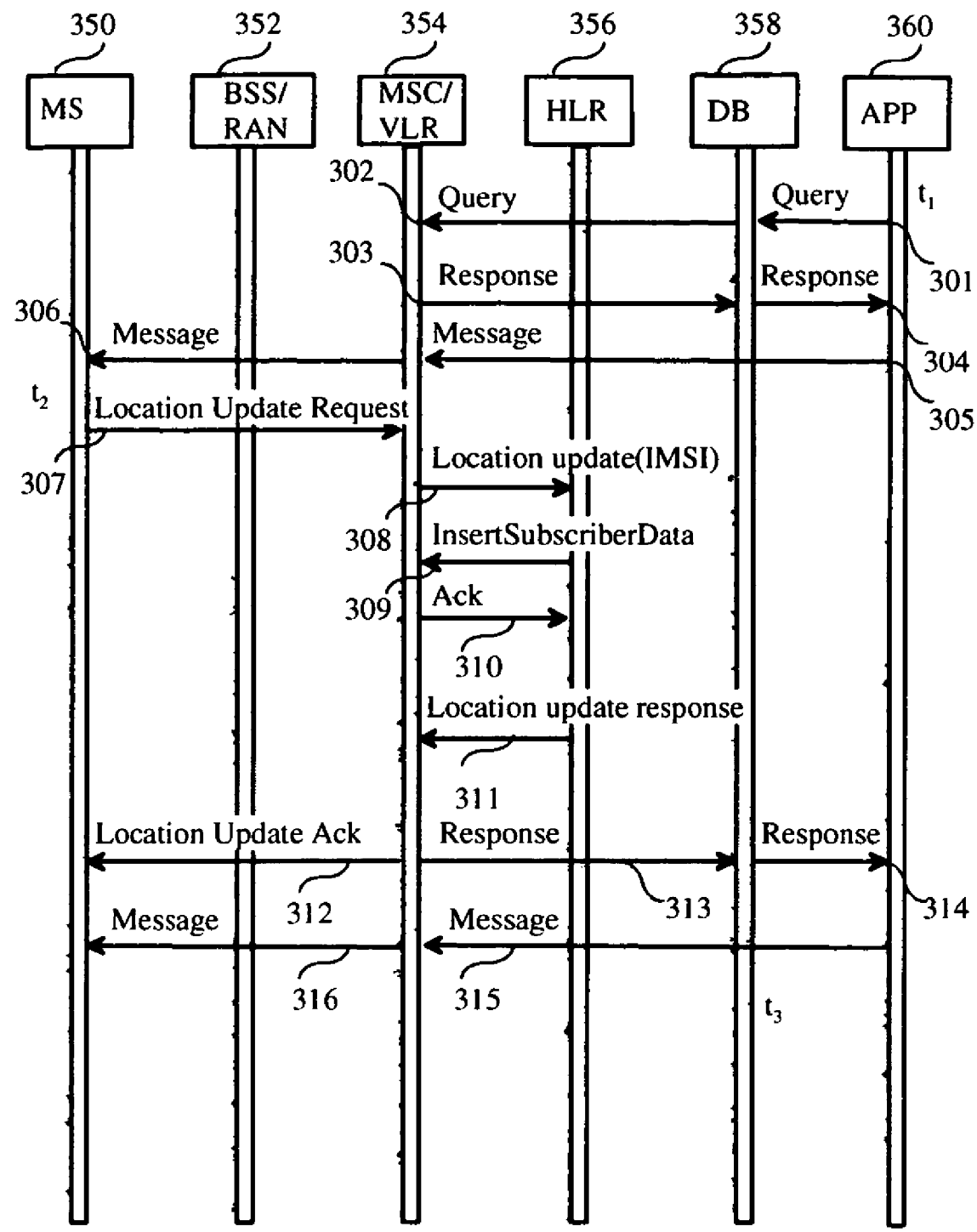
FIG. 3 is a message sequence chart illustrating the delivery of area related messages in one embodiment of the invention.

FIG. 3 is a message sequence chart illustrating the delivery of area related messages in one embodiment of the invention. FIG. 3 illustrates the method from the point of view of a circuit switched Core Network (CS), which may be, for example, a GSM network or a UMTS network. In FIG. 3 there is a Mobile Station 350, a Base Station Subsystem (BSS)/Radio Access Network (RAN) 352, Mobile Switching Center (MSC)/Visitor Location Register (VLR) 354, Home Location Register (HLR) 356, a database server (DB) 358 and an Application Server (APP) 360.

At time $t_1$ there arises a need to send a message to all the subscribers that are located in a given geographical area. In one embodiment of the invention the application server 360 determines a mapping of the geographical area to at least one set, which cell set comprises at least one cell. The mapping is performed by application server 360 using information obtained from the network operator owning the BSS/RAN 352 and MSC 354. The geographical area may be specified for application server 360 using, for example, longitude and latitude coordinates, postal area code, county or state name. Thereupon, application server 360 sends a database query message to database server 358, as illustrated with arrow 301. In one embodiment of the invention, the geographical area is provided to database server 360 in association with the message illustrated with an arrow 301. Application server 360 translates the geographical area to at least one defined cell set. Upon receiving message 301, database server 358 executes a query using the cell set as the search criterion. In practice, the cell set may be expressed as one or more of: a location area, routing area or service area. Database server 358 holds a view to the databases stored by at least one serving node, for example, MSC 354. The query to the view in database server 358 causes database server 358 to send a query message specifying the cell set to MSC 354, as illustrated with arrow 302. The query message comprises at least one cell set under the area served by MSC 354.

Upon receiving the query, MSC 354 performs a search in the monitoring database stored by it, using the specified cell set which is under the area of MSC 354. The search may also provide a history timeframe, which specifies the age of location updates that are to be included in the search. The timeframe is provided from application server 360, via database server 358, in the query message. The monitoring database has been formed earlier from location updates performed by all the subscribers in the area of MSC 354. The subscriber identity, location area in other words the cell set, and other subscriber information are stored to the monitoring database. The monitoring database in MSC 354 is separate from the VLR under MSC 354. It may also contain information on other events such as calls and short messages processed by MSC 354.

In response to the search, MSC 354 obtains, from the monitoring database, a list of the subscribers that are in the area of the specified cell set within the area of MSC 354. The list of the subscribers is returned to database server 358 as illustrated with arrow 303 the list includes at least the subscriber identity for the routing of terminating messages, for example, an MSISDN. Database server 358 collects similar responses from other MSCs and returns the responses to application server 360 as illustrated with arrow 304. Upon receiving the list of the subscribers in the specified cell set, corresponding to the geographical area provided, application server 360 may start sending messages to the subscribers in the list. However, in addition to the sending of message 303 MSC 354 specifies a triggering for subsequent location updates from subscribers in the at least one cell set. The triggering is defined for a period provided by the database server in association with the query messages 301 and 302 or until the database server 358 indicates otherwise. In practice, MSC 354 adds a trigger entry for each location area provided from the database 358. Recall that each location area is in fact a cell set comprising at least one cell. Upon receiving a location update, MSC 354 checks these trigger entries and determines whether the subscriber must be indicated to the database server 358 as a subsequent match for the search issued by it.

Application: server 360 starts sending messages to the list of the subscribers obtained in response to the query. The messages may be, for example, short messages (SMS), multimedia messages (MMS) or Session Initiation Protocol (SIP) instant messages. The content of the messages is, for example, a text notification, at least one picture, at least one picture in combination with text, an audio, a video message or other similar subject matter. The message may be sent to a given MS via a store-and-forward message center or via a session control node. As illustrated with arrow 305, application server sends the message to MSC 354. The message may traverse a store-and-forward message center such as the SMS-C, which obtains routing information for routing of the message to the subscriber indicated. Eventually, the message is received at MSC 354, which sends the message to MS 350 as illustrated with arrow 306.

For the purposes of illustration, it is assumed that MS 350 is powered-off and performs the IMSI detach (not shown) procedure. Later on, it is powered on and at time $t_2$ MS 350 starts updating the location to MSC 354 as illustrated with arrow 307. It should be noted that the procedure is similar for other mobile stations that perform a location updated before time $t_3$ when the reporting of location updates to database server 358 is to be finished. MSC 354 sends a location update request message to HLR 356 as illustrated with arrow 308. The location update request message comprises at least the IMSI associated with MS 350. In response to the receiving of the location update request message HLR 356 sends at least one insert subscriber data message to MSC 354 as illustrated with arrow 309. The insert subscriber data message provides subscriber data associated with MS 350. The subscriber data is updated to the VLR associated with MSC 354. MSC 354 acknowledges insert subscriber data message as illustrated with arrow 310. When all insert subscriber data messages have been acknowledged by MSC 354, HLR 356 sends a location update response message to MSC 354 as illustrated with arrow 311.

Thereupon, MSC 354 checks the triggering records for the monitoring database and determines whether the location update must be informed to database server 358. The determination is performed on the basis of the location area provided in the location update request message 307. If the location update must be informed, MSC 354 sends response message comprising at least the MSISDN to database server 358 as illustrated with arrow 313. Database server 358 provides the subscriber information to application server 360 as illustrated with arrow 314. As illustrated with arrow 315, application server sends the message to MSC 354. The message may traverse a store-and-forward message center such as the SMS-C, which obtains routing information for routing of the message to the subscriber indicated. Eventually, the message is received at MSC 354, which sends the message to MS 350 as illustrated with arrow 316.

Figure 1:
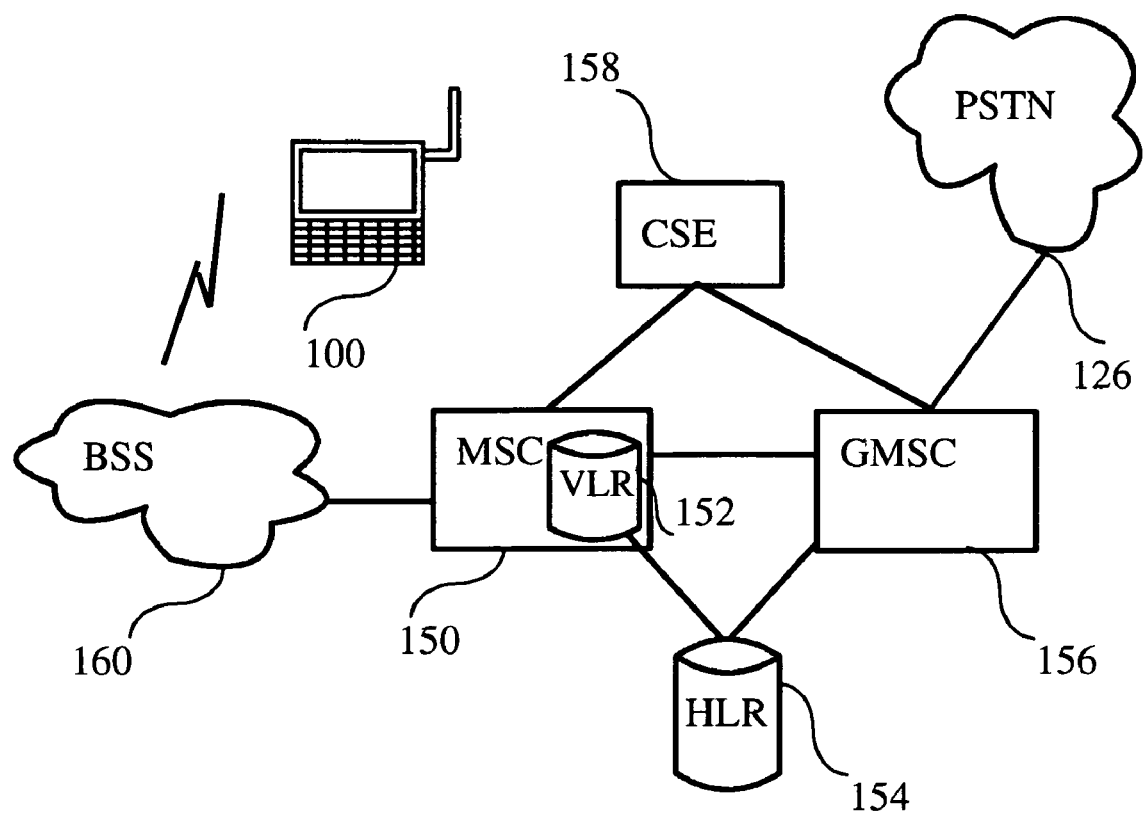
FIG. 1 is a block diagram illustrating a Global System of Mobile Communications (GSM) circuit switched network in prior art.
Figure 2:
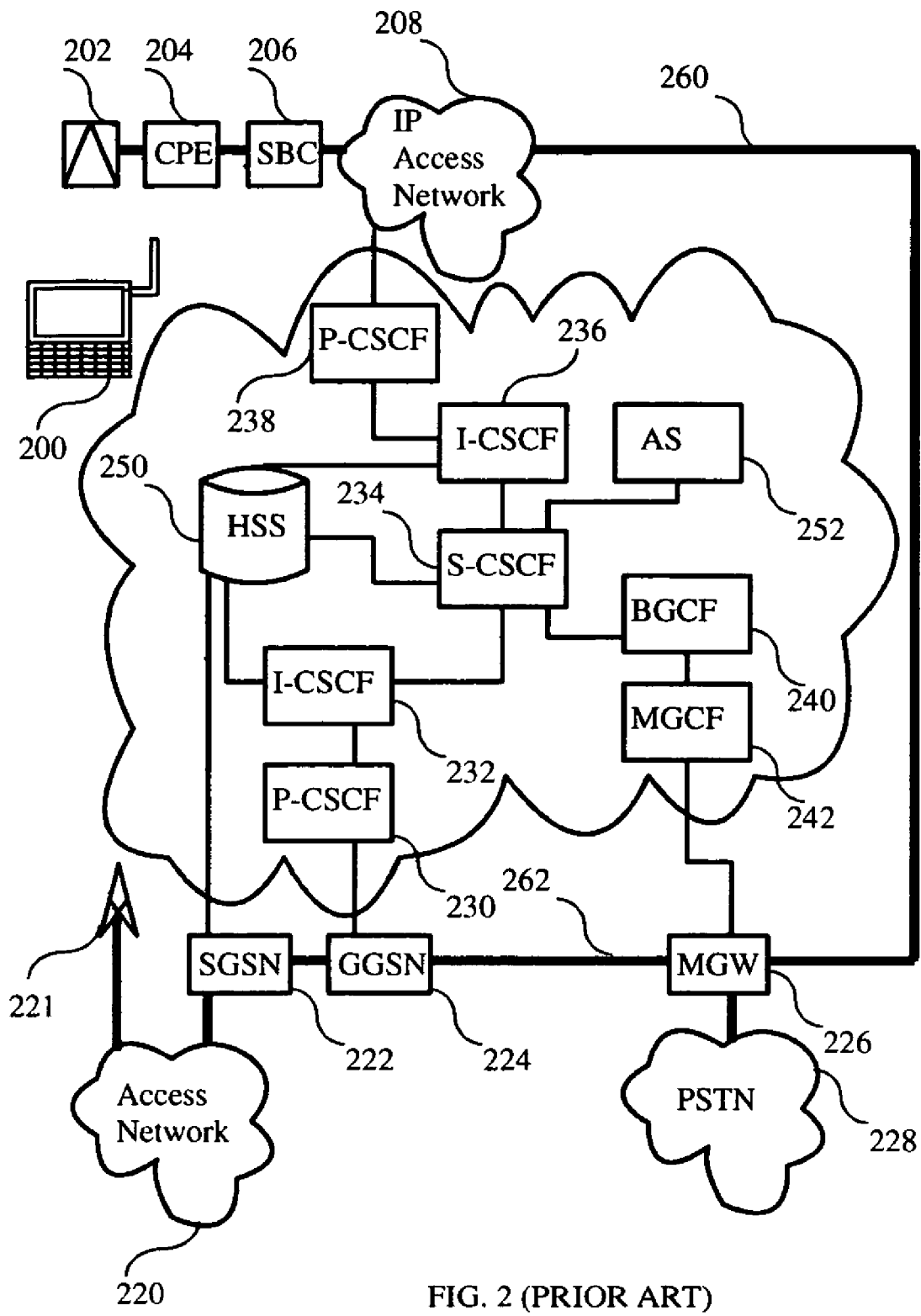
FIG. 2 is a block diagram illustrating a Universal Mobile Communication System (UMTS), a Wireless Local Area Network (WLAN) and an IP Multimedia Subsystem (IMS) in prior art.

In one embodiment of the invention, in place of MSC 354 may also be a Mobile Switching Center Server (MSS). In one embodiment of the invention, in place of MSC 354 may also be a Serving GPRS Support Node (SGSN). The procedure has equivalent messaging. However, in place of the location area is a routing area. In one embodiment of the invention, in place of MSC 354 may also be a Call State Control Function (CSCF), for example, a P-CSCF, an I-CSCF or a S-CSCF as illustrated in FIG. 2. It is beneficial if the CSCFs used for storing the monitoring database and the reporting of subscriber lists per area for database server 358 are located in the network currently serving MS 350.

Figure 4:
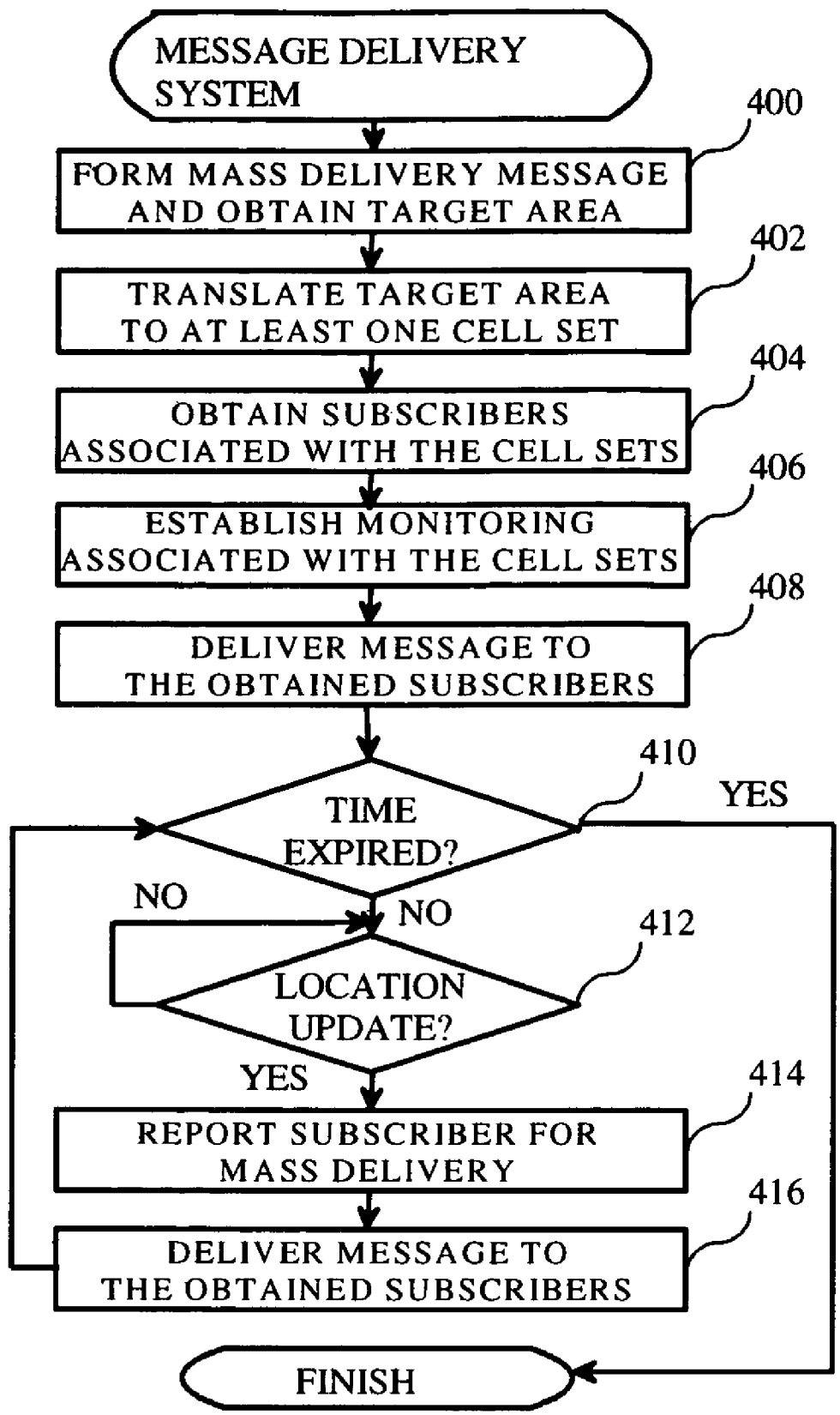
FIG. 4 is a flow chart illustrating a method for the delivery of area related messages in one embodiment of the invention.

FIG. 4 is a flow chart illustrating a method for the delivery of area related messages in one embodiment of the invention.

At step 400 an application server obtains a message for the mass delivery to certain target geographical area. The message may be, for example, a text message, a structured document in Extensible Markup Language (XML) format, a message that comprises picture and text, an audio recording or a video clip.

At step 402 the target geographical area is translated to at least one cell set. The cell set may form, for example, a location area, a routing area or a service area. The translation utilizes a mapping database stored by a network operator or a mapping database otherwise made available for the application server.

At step 404 the application server contacts an interface node, which acts as an interface to a communication system that serves the cell set of the target geographical area. The application server provides to the interface node a query requesting information on all the subscribers in the target area, i.e., the specified cell set. The query may also provide a history timeframe, which specifies the age of location updates that are to be reported.

The interface node analyses the cell set specified and determines a serving node to process the query, based on the identifiers of the cells in the cell sets or identifiers of the cell sets. There is a mapping for cell set or cell identifiers to serving nodes in the communication system that is used by the interface node. The interface node itself may store such a mapping database.

In one embodiment of the invention, all serving nodes known to the interface node area are requested to process the query. Upon identifying a serving node, the interface node sends the query to the serving node to process the query. Each serving node processes the query in a monitoring database stored by it. The query uses at least one cell set identifier or cell identifier as a search criterion. Optionally, a search criterion may include the history timeframe specifying the maximum age of location updates to be included in the search. Each serving node responds to the interface node with a list of subscribers that match the search criteria, that is, the subscribers that were in the area of the cell set or cell identified.

The interface node collects the replies from the individual serving nodes and provides a collected result list to the application server. The subscriber list includes, for each subscriber, at least an identifier for the routing terminating point-to-point communications to the mobile station used by the subscriber. The identifier may be, for example, an MSISDN, a SIP Uniform Resource Identifier or an E-mail address. Other information may be provided such as subscribers home network information or a language identifier, which may be used to determine the correct language for the message by the application server.

At step 406 the serving node, which processed the query at step 404, establishes monitoring associated with the cell set or cell specified in the query. The monitoring is specified as a trigger rule, which is checked each time a location update request is received by the serving node. The monitoring lasts until the time period specified in the query from interface node ends or when the application server requests the end of the monitoring from the serving node via the interface node.

At step 408 the application server starts sending messages to the communication system for delivery to the subscribers in the obtained subscriber list.

At step 410, the serving node checks whether the time specified has expired or whether a request to stop the monitoring has been received. If the time has expired or the request to stop the monitoring has been received, the method ends. The serving node processes the location update normally. If no time period has been specified in the query, the method ends normally as well.

At step 412 a checked is made to determine if a location update, pertaining to any of the monitored cells or cell sets is received. If the location update is not received, the method continues at step 412. If a location update fulfilling the monitoring criteria is received, the method continues at step 414.

At step 414 the subscriber information for the subscriber identified in the location update is reported to the interface node and from there to the application server. The subscriber information includes at least an identifier for the routing terminating point-to-point communications to the mobile station used by the subscriber. The identifier may be, for example, an MSISDN, a SIP Uniform Resource Identifier or an E-mail address. Other information may be provided such as subscribers home network information or a language identifier, which may be used to determine the correct language for the message by the application server.

At step 416 the application server sends the message to the communication system for delivery to the subscriber indicated to it at step 414. Thereupon, the method continues at step 410.

Figure 5:
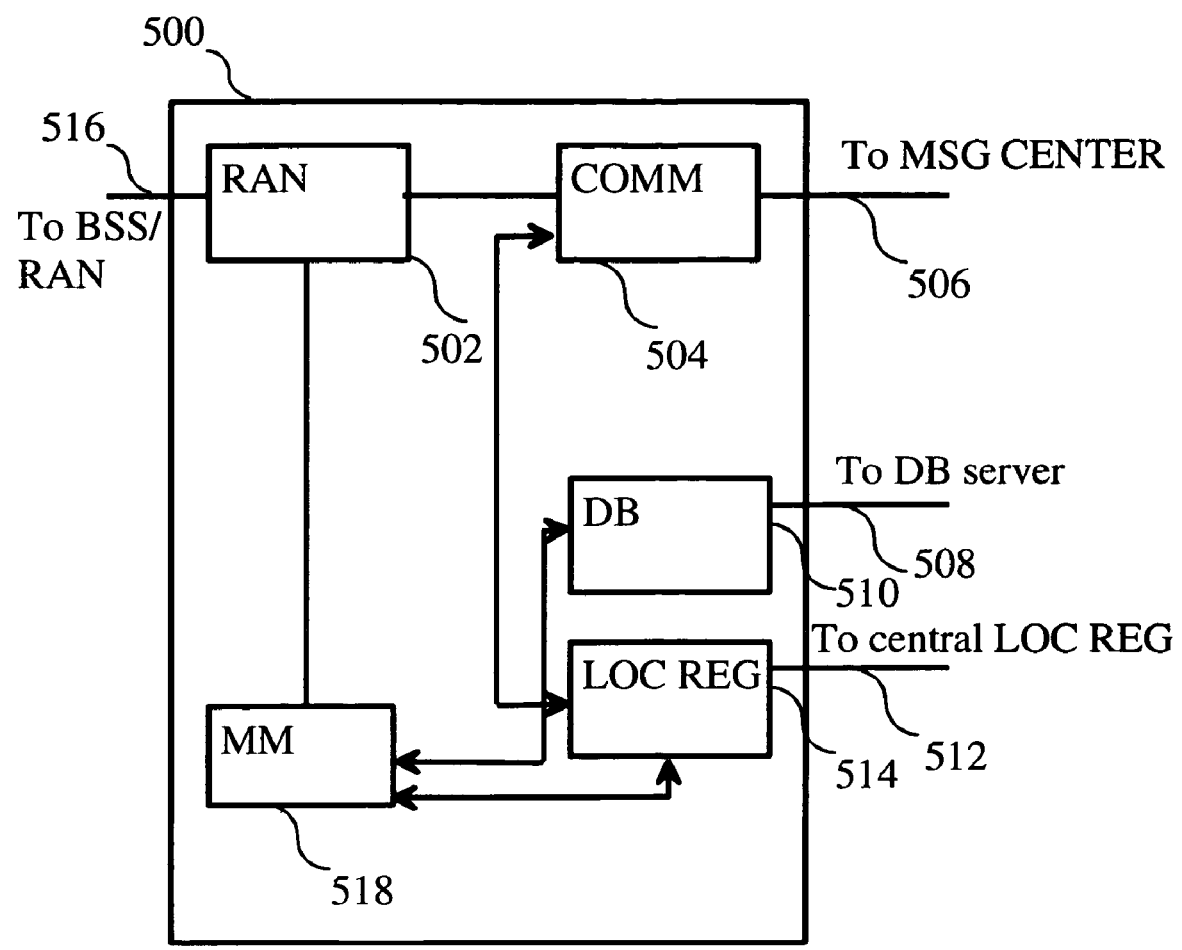
FIG. 5 is a block diagram illustrating a network node for the delivery of area related messages in one embodiment of the invention.

FIG. 5 is a block diagram illustrating a serving node 500 for the delivery of area related messages in one embodiment of the invention. Serving node 500 comprises a radio network entity 502 for communication with a mobile station via the BSS or RAN. The radio network entity 502 has an interface 516 towards a BSS or a RAN (not shown) and therein to a radio network node such as a Base Station Controller (BSC) or a Radio Network Controller (RNC). There is also a communication entity 504, which processes messages or packets for the transmission to mobile stations in the area of serving node 500. Communication entity 504 is associated with an interface 506 to a messaging center. The interface may connect to a packet switched network, to which the messaging center is connected. There is also a mobility management entity 518, which processes location update messages. Location update messages are first received via radio network entity 502 and forwarded from there to mobility management entity 518.

Mobility management entity 518 performs all mobility related tasks such as location update procedures together with location register 514. Mobility management entity 518 performs a location update to a location register 514. The location register 514 stores subscriber information for subscribers in the area of serving node 500. Location register 514 has an interface 512 to a central location register (not shown), which stores mapping information to determine a current serving node for a given subscriber. The central location register may be, for example, a Home Location Register (HLR).

There is also a monitoring database entity 510, which comprises a database that stores information, for example, for to purposes of traffic analysis and statistics. Monitoring database entity 510 performs all monitoring database related management tasks and performs queries to the database and returns responses to the queries. Entities in remote network elements such as the database server as illustrated in FIG. 3 may perform queries to the monitoring database via monitoring database entity 510. The database managed by monitoring database entity 510 stores information on past location updates and other communication events of interest. Monitoring database entity 510 or a separate entity in association with monitoring database entity 510 defines the triggering records for the triggering for future location updates for reporting towards the database server and from there to the application server. The triggering records are checked at each location update. The triggering records specify at least one cell set or at least one cell and the end time of the reporting to the database server for the purposes of message delivery. The database is searched for subscribers associated with at least one cell set or at least one cell at a request received via interface 508 from the database server.

The software components, that is, the entities 502, 504, 510, 514 and 518 illustrated in FIG. 5 may be implemented in various ways. They may be implemented as processes executed under the native operating system. The software entities may be implemented as separate processes or so that a number of different software entities is implemented by means of one process. Some software entities may be implemented as modules linked to another entity. The entities may be executed in separate computer units via communicate via a message bus. The software components may be stored on a computer readable medium, such as a removable memory card, a magnetic or an optical disk.

It is obvious to a person skilled in the art, that with the advancement of technology, the basic idea of the invention may be implemented in various ways. The invention and its embodiments are thus not limited to the examples described above; instead they may vary within the scope of the claims.

The invention claimed is:

1. A method comprising:

specifying for an application server a geographical area and at least one message for delivery to at least one subscriber in said geographic area; translating the geographical area to a first cell set;

performing a search in a database server using said first cell set as search criterion, a database associated with said database server determining information on at least one subscriber in the area of at least one cell in said first cell set;

in response to the search, forming a list of subscriber identities within said first cell set and establishing monitoring associated with the first cell set, the monitoring checking each subsequent location update received against a triggering rule and determining whether the subsequent location update is to be added the list of subscriber identities, wherein the triggering rule comprises:

defining a monitoring period;

upon receiving a location update message from a subscriber, determining whether said monitoring period has expired and whether the location update is from a subscriber in the area of the first cell set; and reporting said subscriber to said application server, if said monitoring period has not expired and the location update is from a subscriber in the area of the first cell set;

the method further comprising:

selecting a first subscriber identity from said list of subscriber identities;

providing said at least one message and said first subscriber identity from said application server to a first network node, said first subscriber identity being an identifier for routing terminating point-to-point communications;

obtaining in said first network node routing information for routing said at least one message to a first subscriber identified with said first subscriber identity; and routing said at least one message to said first subscriber from said first network node using said routing information.

2. The method according to claim 1 wherein obtaining a list of subscribers further comprises:

sending a search request specifying a second cell set to at least one serving node;
performing a search in a database associated with said at least one serving node using said second cell set as a criterion;
providing from said at least one serving node in response a list of subscriber identities in the area of said second cell set; and
delivering said at least one message from said application server to subscribers in said list of subscriber identities.

3. The method according to claim 2, the method further comprising:
defining a monitoring period in said search request;
receiving a location update message in a first serving node among said at least one serving node;
determining in said first serving node whether said monitoring period has expired and whether the location update is from a subscriber in the area of said second set; and reporting said subscriber to said application server, if said monitoring period has not expired and the location update is from a subscriber in the area of said second set.

4. The method according to claim 2, wherein said serving node comprises at least one of a Mobile Services Switching Center (MSC), a Serving General Packet Radio Service Node (SGSN) and a Call State Control Function (CSCF).

5. A system comprising:
memory;
processor;
an application server configured to define a geographical area and at least one message for delivery to at least one subscriber in said geographical area, said application server further configured to:
translate the geographical area to a first cell set,
select a first subscriber identity from a list of subscriber identities, and
provide said at least one message and said first subscriber identity to a network node, said first subscriber identity being an identifier for routing terminating point-to-point communications;
a database server configured to perform a search with said first cell set as search criterion, in response to the search forming said list of subscriber identities within said first cell set and reporting said list to the application server, a database associated with said database server determining information on at least one subscriber in the area of at least one cell in said first cell set, the database server being further configured to establish monitoring associated with the first cell set, the monitoring checking each subsequent location update received against a triggering rule and determining whether the subsequent location update is to be added the list of subscriber identities, wherein the triggering rule comprises:
defining a monitoring period;
upon receiving a location update message from a subscriber, determining whether said monitoring period has expired and whether the location update is from a subscriber in the area of the first cell set; and
reporting said subscriber to said application server, if said monitoring period has not expired and the location update is from a subscriber in the area of the first cell set;
said network node configured to obtain routing information for routing said at least one message to a first subscriber identified with said first subscriber identity, said first subscriber being one of said at least one subscriber, and to route said at least one message to said first subscriber from said network node using said routing information.

6. The system according to claim 5, further comprising:
at least one serving node configured to perform a search in a database in said serving node with a second cell set as a criterion and to provide in response a list comprising information on subscriber identities in the area of said second set; and
wherein said database server is further configured to send a search request specifying the second cell set to the at least one serving node.

7. The system according to claim 6, wherein the database server includes in the search request a definition of a monitoring period and further said serving node configured to determine whether said monitoring period has expired.

8. The system according to claim 7, wherein said serving node determines whether a location update is from a subscriber in the area of said second cell.

9. The system according to claim 7, wherein said serving node further triggers location updates from subscribers in the cell set during said monitoring period.

10. The system according to claim 6, wherein the serving node further comprises:
a location register;
a monitoring database;
a monitoring database entity;
a mobility management entity configured to report information on a location update for said monitoring database entity and to perform location updates to said location register, said information comprising a subscriber identity for the routing of messages to the mobile subscriber performing the location update; and
said monitoring database entity configured to perform a search in said monitoring database using said second cell set as a criterion and to provide in response a listing of subscribers in the area of said second cell set.

11. An apparatus comprising:
a memory;
a database configured to associate information on at least one subscriber in the area of at least one cell in a first cell set; and
a processor, the processor being configured to:
specify a geographical area and at least one message for delivery to at least one subscriber in said geographical area; perform a search in said database using said first cell set as search criterion, and in response to the search, to form a list of subscriber identities within said first cell set;
establish monitoring associated with the first cell set, the monitoring checking each subsequent location update received against a triggering rule and, based in the triggering rule, determining whether the subsequent location update is to be added the list of subscriber identities wherein the triggering rule comprises:
defining a monitoring period;
upon receiving a location update message from a subscriber, determining whether said monitoring period has expired and whether the location update is from a subscriber in the area of the first cell set; and
reporting said subscriber to said application server, if said monitoring period has not expired and the location update is from a subscriber in the area of the first cell set;
the processor further configured to select a first subscriber identity from said list of subscriber identities and to provide said at least one message and said first subscriber identity from said apparatus to a remote apparatus, said first subscriber identity being an identifier for routing terminating point-to-point communications.

12. A computer program embodied on a computer readable non-transitory medium, the computer program comprising code for controlling a processor to execute a method comprising:

specifying a geographical area and at least one message for delivery to at least one subscriber in said geographical area;

translating the geographical area to a first cell set;

performing a search in a database server using said first cell set as search criterion, a database associated with said database server determining information on at least one subscriber in the area of at least one cell in said first cell set;

in response to the search, obtaining a list of subscriber identities within said first cell set and establishing monitoring associated with the first cell set, the monitoring checking each subsequent location update received against a triggering rule and determining whether the subsequent location update is to be added the list of subscriber identities wherein the triggering rule comprises:

defining a monitoring period;

upon receiving a location update message from a subscriber, determining whether said monitoring period has expired and whether the location update is from a subscriber in the area of the first cell set; and reporting said subscriber to said application server, if said monitoring period has not expired and the location update is from a subscriber in the area of the first cell set;

the method further comprising selecting a first subscriber identity from said list of subscriber identities; and providing said at least one message and said first subscriber identity to a first network node for routing, said first subscriber identity being an identifier for routing terminating point-to-point communications.

13. The computer program according to claim 12, wherein said computer readable medium is a removable memory card.

14. The apparatus according to claim 11, wherein said processor is configured to request immediate reporting of subsequent location updates to said first cell set in association with said search from said database.

15. The method of claim 1 further comprising receiving a location update after the list of subscriber identities is formed and determining whether the location update is to be included in the list of subscriber identities based on an age of the location update.

16. The method of claim 1 wherein the triggering comprises checking each location update against a time period included in the search criterion that specifies a maximum age of location updates to be added to the list or determining whether the application server requests an end of the monitoring.

17. The method of claim 1 wherein the search criterion comprises a query that includes a request for information on all subscribers in the area of the first cell set and specifies a maximum age of location updates to be included in the search.

18. The method of claim 1 further comprising that the database is formed from location updates performed by all subscribers in the first cell set.

19. The system of claim 5 further comprising that the database server is configured to compare each location update against a maximum age of location updates specified in the search criterion, and wherein the database server only adds a location update to the list when the location update does not exceed the maximum age or the application server requests an end to the monitoring of location updates.

20. The apparatus of claim 11 wherein the processor is further configured to check each subsequent location update against a time period included in the search criterion that specifies a maximum age of location updates to be added to the list or determining whether the application server requests an end of the monitoring in order to determine which location updates to add to the list.

* * * * *